United States Patent [19]

Vukmanic et al.

[11] Patent Number: 4,549,383
[45] Date of Patent: Oct. 29, 1985

[54] SUSPENDED CEILING GRID SYSTEM

[75] Inventors: Ronald W. Vukmanic, Naperville; John S. Borucki, Bloomingdale; Chester A. Stanley, Des Plaines, all of Ill.

[73] Assignee: Chicago Metallic Corporation, Chicago, Ill.

[21] Appl. No.: 530,379

[22] Filed: Sep. 8, 1983

[51] Int. Cl.[4] .............................................. F16B 7/22
[52] U.S. Cl. ...................................... 52/667; 52/726; 52/729; 403/347
[58] Field of Search ................. 52/664, 666, 667, 668, 52/484, 726, 729, 738; 403/347, 346, 252

[56] References Cited

U.S. PATENT DOCUMENTS

| | | | |
|---|---|---|---|
| 2,354,054 | 7/1944 | Plym | 403/346 |
| 3,399,915 | 9/1968 | Stanzak | 52/726 |
| 3,496,690 | 2/1970 | Jahn | 52/726 |
| 3,746,379 | 7/1973 | Sauer | 52/667 |
| 3,846,031 | 11/1974 | Adams | 52/726 |
| 3,922,829 | 12/1975 | Sauer | 52/667 |
| 3,979,874 | 9/1976 | Cubbler | 52/664 |
| 4,043,689 | 8/1977 | Spencer | 52/667 |
| 4,079,563 | 3/1978 | Ollinger | 52/664 |
| 4,314,432 | 2/1982 | Rosenbaum | 52/484 |
| 4,317,318 | 3/1982 | Sauer | 52/667 |
| 4,364,686 | 12/1982 | Sharp | 52/667 |
| 4,462,198 | 7/1984 | Sharp | 52/484 |
| 4,484,428 | 11/1984 | Sauer | 52/667 |

Primary Examiner—John E. Murtagh
Attorney, Agent, or Firm—August E. Roehrig, Jr.

[57] ABSTRACT

An interconnected runner system formed by elements structurally interconnected to form main runners and intersecting cross T runners. The main runners and cross T runners are structurally interconnected to prevent unintentional or accidental disengagement, and function to provide a structure wherein objects may be suspended beneath the suspended ceiling supported from the grid forming runners throughout the grid structure.

9 Claims, 9 Drawing Figures

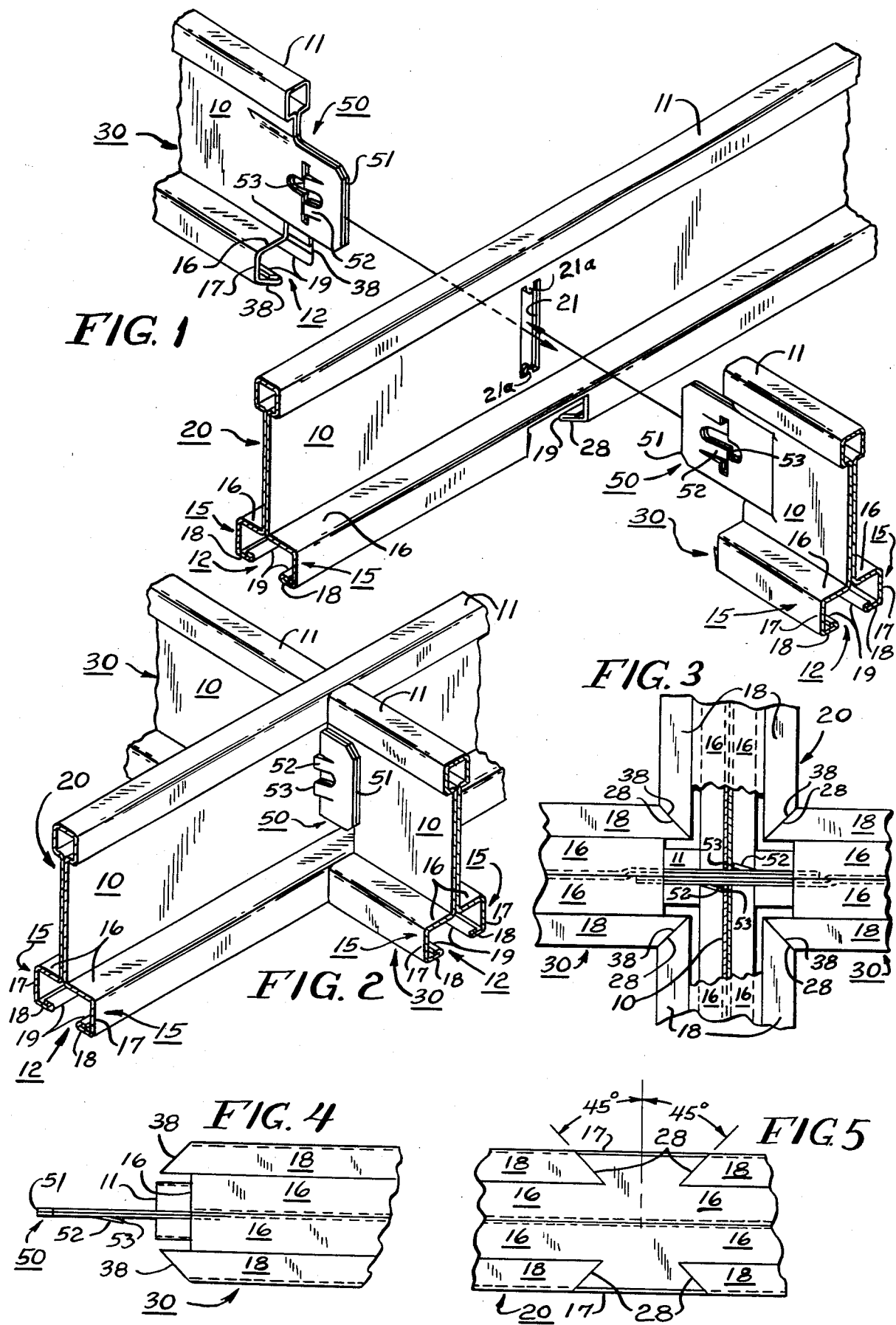

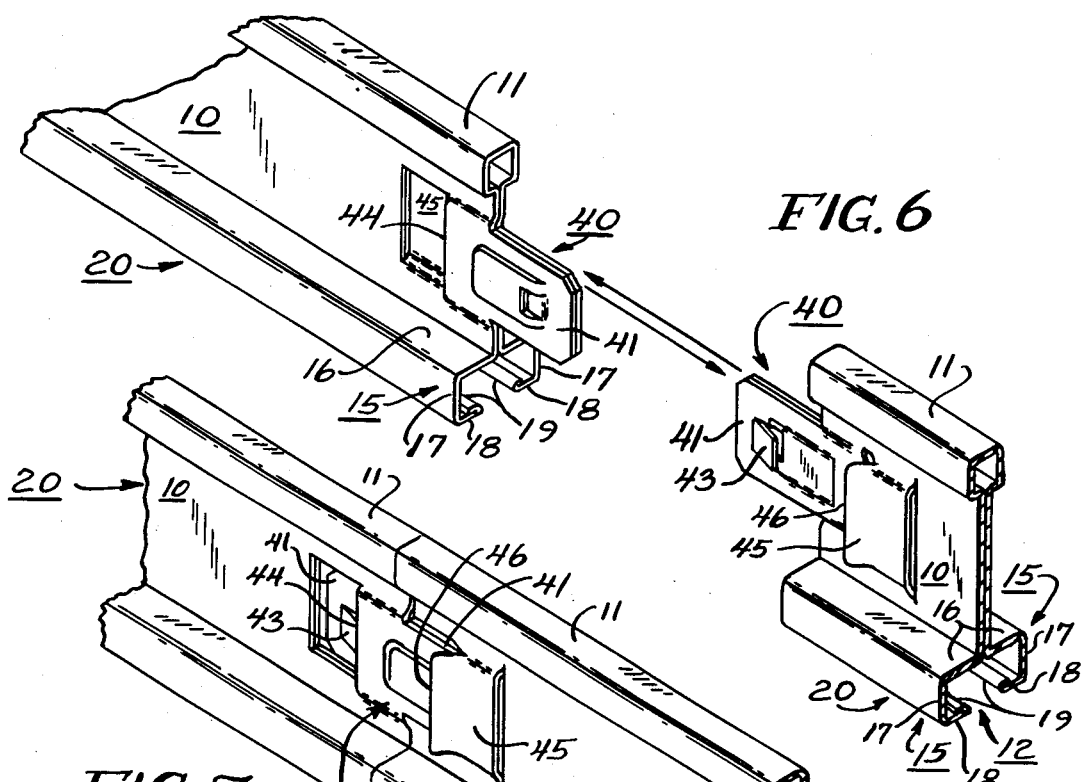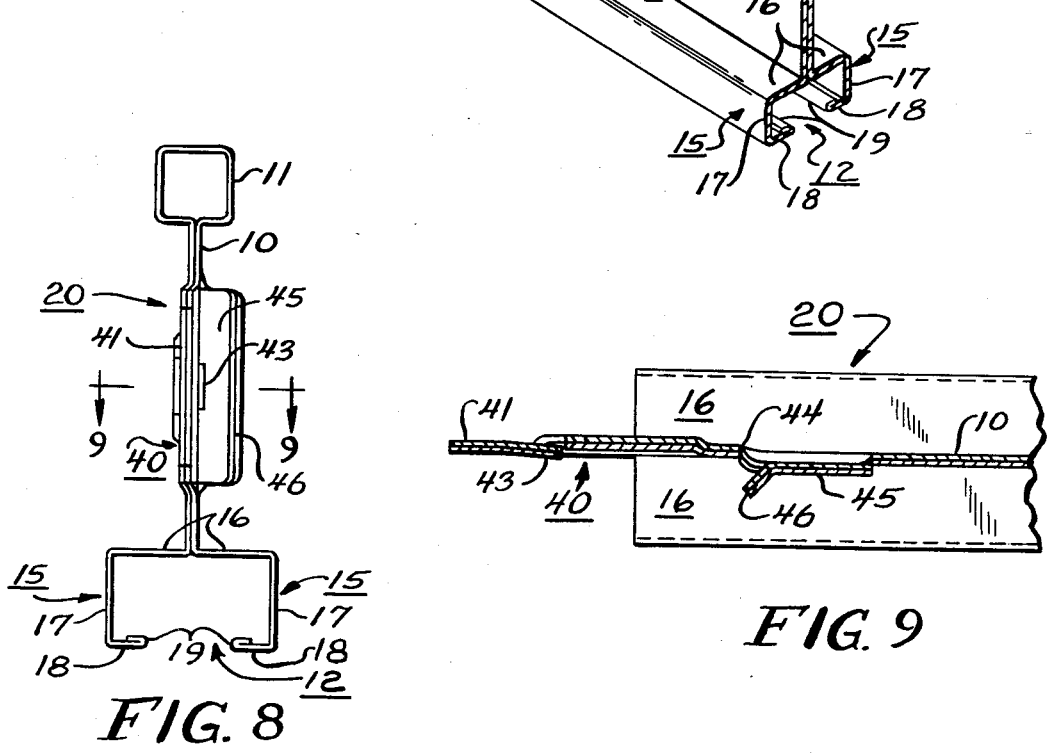

SUSPENDED CEILING GRID SYSTEM

BACKGROUND OF THE INVENTION

This invention relates in general to suspended ceiling systems and, in particular, to a grid system used for supporting such things as ceiling panels, lighting or mechanical services fixtures, or light diffusers used in forming a suspended ceiling system.

More specifically, but without restriction to the particular use which is shown and described, this invention relates to a grid system formed from intersecting main runners and cross T-runners, which are arranged to form the grid system defining a pattern of rectangular openings between the runners from which such ceiling panels, lighting or ventilating fixtures and light diffusing grids may be supported.

As is well known, suspended ceilings may be constructed through the use of a metallic grid comprising main runners intersected by and connected with other runners referred to as cross Ts, for both architectural and engineering purposes to provide aesthetically pleasing interior design and an area for containing mechanical and electrical services for distribution throughout the interior. Such a grid structure provides support for various components of the electrical and mechanical services such as heating, ventilating, lighting and sound absorption.

In order to provide this function, such grid structure must have sufficient structural integrity in order to support the various components of the electrical and mechanical services without interferring with the aesthetics of the interior for which the suspended ceiling is formed. In applications, such grid systems, by which the suspended ceiling is formed, must be constructed on site. To this end the components of the grid system are supplied in standard shippable lengths which must be interconnected at the job site for forming the grid system by which the suspended ceiling is formed. Since the individual elements from which the runners are formed must be interconnected into a grid system, it is essential that the interconnection between the grid forming elements, both in forming the main runners and the cross T runners which intersect therewith, be readily assembled and sufficiently rigid to prevent unintentional or accidental disengagement. Such interconnection must also be sufficiently unobtrusive to blend into the interior design of the ceiling so that the grid system does not detract from the overall aesthetic design of the interior.

SUMMARY OF THE INVENTION

It is, therefore, an object of this invention to improve suspended ceiling systems.

Another object of this invention is to rigidly interconnect the grid forming runners of a suspended ceiling system in a manner which prevents the accidental or unintentional separation thereof.

A further object of this invention is to structurally interconnect the grid forming members for a suspended ceiling system in a manner which blends in aesthetically with the interior design of the suspended ceiling.

Still another object of this invention is to construct a grid system for a suspended ceiling wherein the grid forming structure permits suspension of objects below the grid system throughout the grid forming pattern.

These and other objects are attained in accordance with the present invention wherein there is provided an interconnected runner system formed by elements structurally interconnected to form main runners and intersecting cross T runners. The main runners and cross T runners are structurally interconnected to prevent unintentional or accidental disengagement, and function to provide a structure wherein objects may be suspended beneath the suspended ceiling supported from the grid forming runners throughout the grid structure.

DESCRIPTION OF THE DRAWINGS

Further objects of the invention, together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is an exploded view, in perspective, of a portion of a main runner and intersecting cross T runners used in forming a grid system;

FIG. 2 is a perspective view of the runners illustrated in FIG. 1 in an engaged position;

FIG. 3 is an horizontal planar view of the bottom of an intersecting connection between a pair of interconnected cross T runners engaging a main runner such as shown in FIG. 2;

FIG. 4 is an enlarged horizontal planar view of the bottom of a cross T runner to better illustrate the construction thereof;

FIG. 5 is an enlarged horizontal planar view of the bottom of a main runner to better illustrate the construction thereof;

FIG. 6 is an exploded view, in perspective, of the fastening portions of a main runner used to interconnect one main runner element to another for forming the grid system;

FIG. 7 is a perspective view of the main runner forming elements illustrated in FIG. 6 shown in an engaged position;

FIG. 8 is an end profile view of one of the main runner forming elements to better illustrate the construction thereof; and FIG. 9 is a sectional view taken along line 9—9 of FIG. 8.

DESCRIPTION OF A PREFERRED EMBODIMENT

Referring now to FIG. 1, there is shown in perspective an exploded view of a portion of the grid forming elements used in creating a grid system by which a suspended ceiling is formed. The grid system comprises a plurality of main runners 20 which are adapted to cooperate with a plurality of cross T runners 30 which interlock with each other upon engagement through an H-slot 21 formed in the main runner 20 to form a rigid interlocking juncture. The H-slot 21 includes two lock members or dimples 21a which extend vertically toward each other from the top and bottom horizontal surface of the H-slot 21 to perform a function hereinafter described in detail. Portions of each of the main runners 20 and cross T runners 30 are formed the same, and such parts will be identified by the same reference numeral for convenience of illustration.

Each of the runners 20 and 30 is formed from a single sheet metal structure folded upon itself in a particular manner and formed to define an upstanding web portion 10 extending between a closed upper flange or a top bulb 11 and an open bottom flange 12. The bulb portion 11 may be of various forms such as the square shape as shown, or rectangular depending upon the particular application for the grid structure. The lower or bottom flange 12 is open and in cross section forms an open rectangle comprising a pair of J-shaped portions 15 extending in opposed directions.

The upper or longer leg 16 of the J-shaped portion 15 is formed as a single thickness extension from the double thickness of the web 10, and is bent downwardly forming a center portion 17 which extends parallel to the web portion 10. The lower edge 18 of the J-shaped portion is bent inwardly to form a short leg portion which extends parallel to the longer leg 16 and has the terminal end folded inwardly upon itself to form a double thickness lip 19 thereby defining an opening between the two opposed inwardly turned lip portions 19.

Such a construction forms a hollow rectangular structure with a predetermined opening in the bottom thereof throughout the length of the runners 20 and 30, and into which T-bolts (not shown) may be placed to be moved throughout the grid system for supporting or suspending objects beneath the grid. As best shown in FIGS. 3-5, ends 38 of the inwardly turned portions 18 of the cross T runners 30, are beveled in a horizontal plane to abut complementary bevel cut portions 28, on the inwardly turned portions 18 of the main runners 20, at the point where the main and cross T runners join together in forming an interlocking juncture. Beveling of the intersecting portions of the runners provides an aesthetically pleasing appearance and facilitates movement of T-bolts throughout the grid system.

In forming the suspended ceiling, the grid system is supported from an overhead structure of a building by suitable hanger wires (not shown), which are attached at spaced intervals along the main runners 20. These main runners 20 are frequently fabricated in standard lengths suitable for shipping to a job site whereat they are joined for creating a portion of the grid system. To this end, complementary tab formations or connectors 40 are formed on adjacent ends of the main runner 20, best shown in FIGS. 6-9, which upon engagement form a locking juncture between the main runner 20 elements by which any desired length of main runner is formed. These complementary tabs 40 extend parallel to, and outwardly from, the web portion 10 of the main runner elements 20, and are constructed for interlocking engagement so that the leading edge of a following main runner element 20 will abut the trailing edge of a leading main runner element to which it is connected, such as shown in FIG. 7.

Each of the tab connectors 40 are formed in an identical manner, but are offset from a vertical plane which extends along a longitudinal axis of the main runner 20, bisecting the main runner into two identical halves, a distance approximately equal to one-half of the thickness of web 10. The tab connectors 40 are formed with a protruding tang portion 41 of a reduced height. A shear formed interlock tab 43 is formed in the central part of the protruding portion 41 to lock with a complementary tab connector upon sliding movement of the protruding tang portions 41 into parallel face-to-face engagement.

A pocket 45 is formed on each main runner element 20 from the double wall thickness of the web 10, and extends outwardly a sufficient distance to receive the double thickness tang portion 41 of a complementary tab connector 40 into the pocket. The entrance portion of the pocket 45 is provided with an outwardly turned lip 46 to guide the insertion of the tang 41 into the pocket. The leading edge of each of the complementary tang portions has a somewhat rounded configuration to facilitate engagement.

Upon engagement of two tab connectors 40, the main runner elements 20 are each held within the pocket portions 45 of the other, and the trailing edge of the shear formed interlock tabs 43 of each is engaged against an edge 44 from which the pocket 45 is formed. The interlocking of the tabs 43 with the edge 44 prevents the two main runner elements 20 from being disengaged, unless the shear formed interlock tabs 43 are intentionally deflected from engagement with the trailing edges 44.

In completing the grid system, cross T runners 30 are joined together through the main runner 20 thereby forming an interlocking connection between two cross T runners and the main runner. To this end the cross T runners 30 are formed with complementary outwardly protruding tang connectors 50 formed from the double thickness web portion 10, but of a reduced height. Each of the tang connectors 50 is formed with a curved leading edge 51 to facilitate insertion through the H-slot 21 formed in the web portion 10 of the main runner element 20, and through which the complementary tang portions 50 are inserted in forming the interlocking juncture between the two cross T runners 30 and the main runner 20.

Each of the tang portions 50 are offset, a distance approximately equal to one-half of the thickness of the web 10, from a vertical plane extending through the longitudinal axis of the cross T runner bisecting the runner into two symmetrical halves. The tang portion 50 are each formed with a double shear formed interlocking tab 52 which extends outwardly from the tang 50 and has a trailing edge 53. Upon insertion of the tangs 50 through the H-slot 21, formed in the main runner 20, the side of the web 10 opposite to the direction from which the interlock tabs are inserted will be engaged by the trailing edge 53 in combination with a complementary tang 50 of an opposed cross T runner, forms an interlocking connection between the opposed cross T runners and the main runner as best illustrated in FIGS. 2 and 3. The lock members or dimples 21a of H-slot 21 function to retain each of the opposed cross T runners 30 independently interlocked with the main runner 20. In this manner a single cross T runner 30 may be interlocked with the main runner 20 without the presence of an opposed cross T runner in operative engagement therewith, to facilitate fabricating the suspended ceiling grid system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed and illustrated as the best mode presently contemplated for carrying out this invention, but that the invention will include any embodiments falling within the scope of the appended claims.

What is claimed is:

1. A support runner for use in forming a grid system in support of a suspended ceiling comprising a beam member including a web extending vertically between a closed flange formed at an uppermost portion of said web and an open flange formed at a lowermost portion of said web, said vertically extending web being formed of a double thickness of material which terminates at the lowermost portion of said web for forming said open flange, said open flange being formed at the lowermost vertical portion of said web of double material thickness by separating said double thickness and extending a single thickness of material from the said double material thickness horizontally outwardly in opposed directions then vertically downward parallel to each other, and then horizontally inwardly toward each other with the terminal ends of each single thickness thereof being turned back upon itself forming an inwardly turned lip defining a parallel spaced opening in said flange, said inwardly turned lip and said lowermost horizontally extending inwardly turned portion of said open flange having a beveled opening formed therein at a position spaced inwardly from the ends of said beam member for engagement by another support runner in forming a suspended ceiling grid system, said beam web having a substantially H-shape opening formed therein including at least two locking members extending toward each other from upper and lower surfaces of said web by which a portion of said H-shape opening is formed at a position adjacent to said beveled opening formed in said inwardly turned lip and said lowermost horizontally extending inwardly turned portion of said open flange of a size sufficient to receive a portion of said other support runner when in engagement with said beveled opening, a tab connector protruding outwardly from said web for engagement with a complementary tab connector protruding outwardly from the web of another beam member to form an end-to-end joinder of said beam member with the other beam member, said tab connector being carried in a vertical plane parallel to a vertical plane passing through the longitudinal axis of said beam member and offset therefrom a distance approximately equal to one-half the thickness of said web, an interlocking tab formed from a portion of said tab connector near the forward end thereof and having a trailing edge extending angularly outwardly from said tab connector for forming a portion of a locking connector to interlock said beam member to another beam member, and a pocket for receiving the tab connector of another beam member, said pocket being formed from said web at a position adjacent to the rear of said tab connector, said portion of said web from which said pocket is formed defining an edge for engagement by the tab connector of another beam member to interlock said beam member with the other beam member.

2. The support runner of claim 1 wherein said interlocking tab is shear formed from said tab connector.

3. The support runner of claim 1 wherein said pocket for receiving the tab connector of another beam member is formed with a lip portion at the entrance thereto for facilitating insertion of the tab connector.

4. The support runner of claim 1 wherein said H-shape opening is of a size sufficient to receive therethrough a portion of two other support runners for independently interlocking each of said other support runners with said beam web.

5. A support runner for use in forming a grid system in support of a suspended ceiling comprising a beam member including a vertically extending web having a closed flange formed at an uppermost portion of said web and an open flange formed at a lowermost portion of said web, said vertically extending web being formed of a double thickness of material which terminates at the lowermost portion of said web for forming said open flange, said open flange being formed at the lowermost vertical portion of said web of double material thickness by separating said double thickness and extending a single thickness of material from the said double material thickness horizontally outwardly in opposed directions then vertically downward parallel to each other, and then horizontally inwardly toward each other with the terminal ends of each single thickness thereof being turned back upon itself forming an inwardly turned lip defining a parallel spaced opening in said flange, a tang connector formed from a portion of said web and protruding outwardly therefrom for engagement with other support runners in forming a grid system in support of a suspended ceiling, said tang connector being carried in a vertical plane parallel to and offset from a vertical plane passing through the longitudinal axis of said beam member and spaced therefrom a distance approximately equal to one-half the thickness of said web, an interlocking tab formed from a portion of said tang connector near the forward end thereof and extending outwardly therefrom with a trailing edge for forming an interlocking connection with other support runners to form a suspended ceiling grid system, said interlocking tab comprising two separate members extending outwardly from a common base and spaced substantially parallel to each other and extending outwardly from said tang connector in the same direction as said tang connector is offset from said vertically extending web, and said inwardly turned lip and said lowermost horizontally extending inwardly turned portion of said open flange at the ends of said open flange being beveled and extending outwardly therefrom for engagement with another support runner for forming a suspended ceiling grid system.

6. The support runner of claim 5 wherein said interlocking tab is shear formed from said tang connector.

7. A grid system for forming a suspended ceiling comprising a plurality of main runners each including a vertically extending main runner web having a closed flange formed at an uppermost portion of said web and an open flange formed at a lowermost portion of said web, said vertically extending web being formed of a double thickness of material which terminates at the lowermost portion of said web for forming said open flange, said open flange being formed at the lowermost vertical portion of said web of double material thickness by separating said double thickness and extending a single thickness of material from the said double material thickness horizontally outwardly in opposed directions then vertically downward parallel to each other, and then horizontally inwardly toward each other with the terminal ends of each single thickness thereof being turned back upon itself forming an inwardly turned lip defining a parallel spaced opening in said flange, said inwardly turned lip and said lowermost horizontally extending inwardly turned portion of said open flange having a beveled opening formed therein at a position spaced inwardly from the ends of each of said main runners for engagement by at least one cross T runner in forming a suspended ceiling grid system, each of said main runner webs having a substantially H-shape opening formed therein including at least two locking members extending toward each other from upper and lower surfaces of said web by which a portion of said H-shape opening is formed at a position adjacent to said beveled opening formed in said inwardly turned lip and said lowermost horizontally extending inwardly turned portion of said open flange of a size sufficient to receive a portion of a cross T runner when in engagement with said beveled opening, a tab connector protruding outwardly from each end of each of said main runner webs for engagement with a complementary tab connector protruding outwardly from each end of the web of another main runner to form an end-to-end joinder of one main runner to another main runner, said tab connectors at each end of said main runners being carried in a vertical plane parallel to a vertical plane passing through the longitudinal axis of said main runner with each of said tab connectors being offset therefrom in opposed directions a distance approximately equal to one-half the thickness of said web, an interlocking tab formed from a portion of said tab connectors near the terminal ends thereof and having a trailing edge extending outwardly therefrom in the same direction as said tab connector is offset for forming an interlocking connection with another main runner to form an end-to-end abutting joinder thereof, a tab connector receiving pocket formed at each end of said main runners from said main runner web at a position adjacent to each of the tab connectors formed on said main runners and protruding outwardly from said web in a direction opposite to the offset of said adjacent tab connector, said portion of said main runner web from which said pockets are formed defining an edge for engagement by a tab connector of another main runner to interlock said main runners in end-to-end abutting relationship, a plurality of cross T runners each including a vertically extending cross T runner web having a closed flange formed at an uppermost portion of said web and an open flange formed at a lowermost portion of said web, said vertically extending cross T runner web being formed of a double thickness of material which terminates at the lowermost portion of said web for forming said open flange, said open flange being formed at the lowermost vertical portion of said web of double material thickness by separating said double thickness and extending a single thickness of material from the said double material thickness horizontally outwardly in opposed directions then vertically downward parallel to each other, and then horizontally inwardly toward each other with the terminal ends of each single thickness thereof being turned back upon itself forming an inwardly turned lip defining a parallel spaced opening in said flange, said inwardly turned lip and said lowermost horizontally extending inwardly turned portion of said open flange at the ends of said cross T runners being beveled for engagement with said beveled opening formed in the open flange of said main runner to form an open intersection at the joinder of said open flanges, a tang connector formed at each end of said cross T runners from a portion of said web and protruding outwardly therefrom for engagement with said locking members of said substantially H-shape opening in a main runner to form a grid system in support of a suspended ceiling, said tang connectors being carried in a vertical plane parallel to and offset from a vertical plane passing through the longitudinal axis of said cross T runners with each of said tang connectors being offset therefrom in opposed directions a distance approximately equal to one-half the thickness of said cross T runner web, and an interlocking tab formed from a portion of each of said tang connectors near the forward end thereof and protruding outwardly therefrom in the same direction as the offset of said tang connectors from which said tab is formed and having a trailing edge for forming an interlocking connection with a main runner through said locking members of said substantially H-shape opening formed therein to form a suspended ceiling grid system, said interlocking tab comprising two separate members extending outwardly from a common base and spaced substantially parallel to each other and both of said members extending outwardly from said tang connector in the same direction as said tang connector is offset from said vertically extending web.

8. The grid system of claim 5 wherein said trailing edge of said interlocking tabs formed from a portion of said tang connectors of said cross T runners, upon passing through said substantially H-shaped opening formed in said main runners between one of said locking members and an adjacent edge of said web, engages said web of said main runner on a side opposite from the direction in which said tang connector is inserted to form an interlocking connection between said cross T runners and said main runners.

9. The grid system of claim 7 wherein said interlocking tabs of said main runners are shear formed from said tab connectors, and said interlocking tabs of said cross T runners are shear formed from said tang connectors.

* * * * *